US011463758B2

(12) United States Patent
Eluvan et al.

(10) Patent No.: US 11,463,758 B2
(45) Date of Patent: Oct. 4, 2022

(54) SYSTEMS, METHODS, AND DEVICES FOR OPTIMIZING STREAMING BITRATE BASED ON MULTICLIENT DISPLAY PROFILES

(71) Applicant: SLING MEDIA PVT LTD, Bangaluru (IN)

(72) Inventors: Rakesh Eluvan, Bangalore (IN); Jayaprakash Ramaraj, Bangalore (IN); Preetham Kotian, Udupi (IN); Satish Nayak, Bangalore (IN)

(73) Assignee: Sling Media Pvt. Ltd., Bengaluru (IN)

( * ) Notice: Subject to any disclaimer, the term of this patent is extended or adjusted under 35 U.S.C. 154(b) by 3 days.

(21) Appl. No.: 16/908,379

(22) Filed: Jun. 22, 2020

(65) Prior Publication Data
US 2020/0322667 A1     Oct. 8, 2020

Related U.S. Application Data

(63) Continuation of application No. 16/218,312, filed on Dec. 12, 2018, now Pat. No. 10,694,239.

(51) Int. Cl.
| H04N 21/2662 | (2011.01) |
| H04N 21/2343 | (2011.01) |
| H04N 21/258 | (2011.01) |
| H04L 65/80 | (2022.01) |

(52) U.S. Cl.
CPC ... *H04N 21/2662* (2013.01); *H04N 21/23439* (2013.01); *H04N 21/25825* (2013.01); *H04L 65/80* (2013.01)

(58) Field of Classification Search
None
See application file for complete search history.

(56) References Cited

U.S. PATENT DOCUMENTS

| 9,083,581 B1 | 7/2015 | Addepalli et al. |
| 9,247,313 B1 | 1/2016 | Lewis et al. |
| 2008/0201748 A1 | 8/2008 | Hasek et al. |

(Continued)

FOREIGN PATENT DOCUMENTS

WO    2017030865 A1    2/2017

*Primary Examiner* — Chikaodili E Anyikire
(74) *Attorney, Agent, or Firm* — KW Law, LLP

(57) ABSTRACT

Systems, methods, and devices are provided for optimizing streaming bitrate during multiclient streaming sessions based, at least in part, on display profiles associated with client media receivers to which different video streams are concurrently provided. The method may be carried-out by a streaming media server in communication with first and second client media receivers over a network. In various embodiments, the method may include establishing at the streaming media server first and second bandwidth allotment thresholds based, at least in part, on display profiles assigned to display devices associated with the client media receivers. During an ensuing multiclient streaming session, the streaming media server further encodes segments of video streams at variable bitrates regulated in accordance with the established bandwidth allotment thresholds. Additionally, the streaming media server transmits the encoded segments of the video streams over the network to the client media receivers for presentation on the display devices.

20 Claims, 2 Drawing Sheets

(56) References Cited

U.S. PATENT DOCUMENTS

Figure 1:
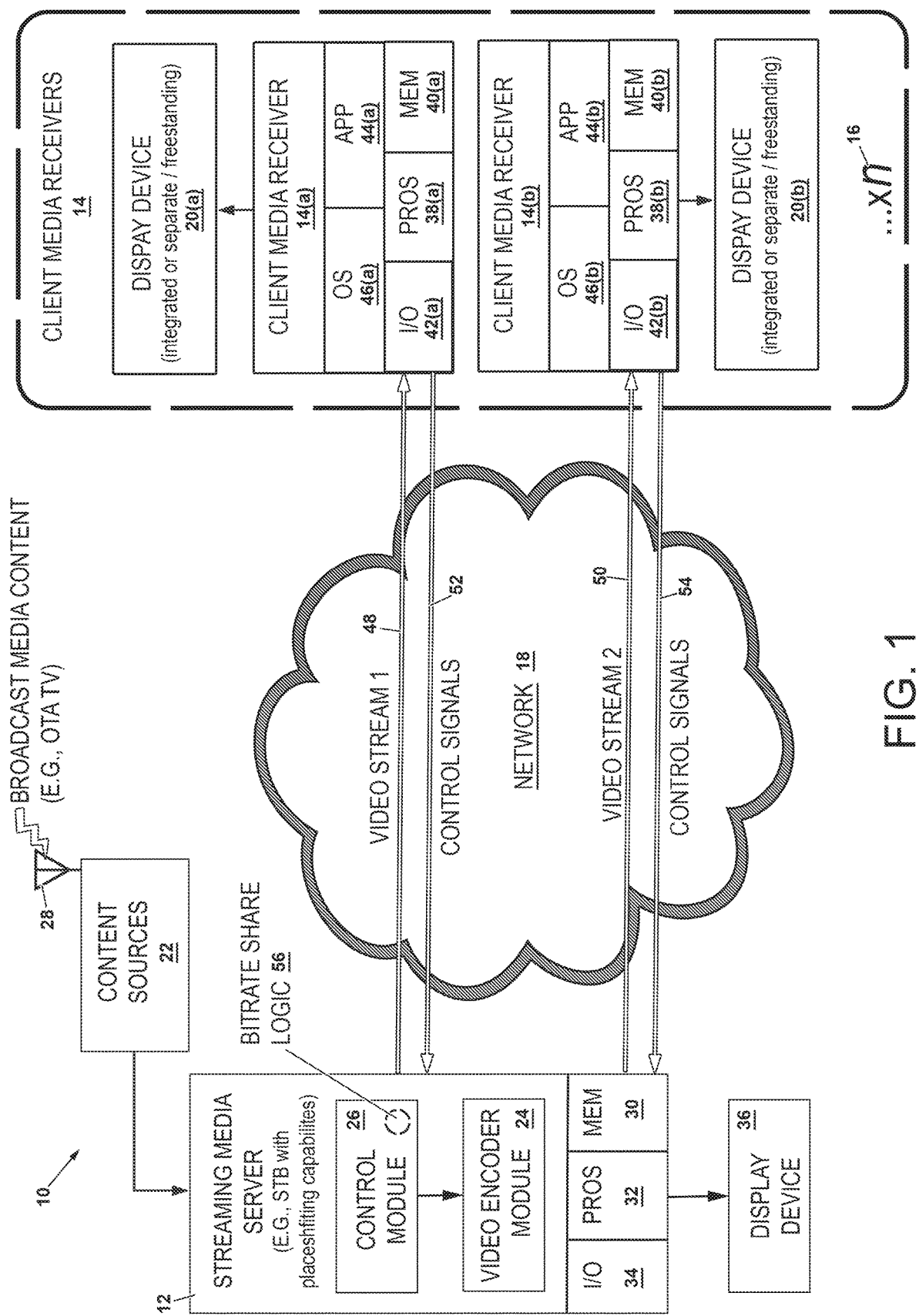

| | | | |
|---|---|---|---|
| 2008/0225180 A1* | 9/2008 | Callway | G09G 5/006 |
| | | | 348/725 |
| 2010/0082567 A1 | 4/2010 | Rosenblatt et al. | |
| 2015/0070585 A1 | 3/2015 | Sharif-Ahmadi et al. | |
| 2015/0249622 A1 | 9/2015 | Phillips et al. | |
| 2016/0080448 A1 | 3/2016 | Spears et al. | |
| 2016/0088322 A1 | 3/2016 | Horev et al. | |
| 2016/0179830 A1* | 6/2016 | Schmalstieg | G06F 16/9537 |
| | | | 707/722 |
| 2016/0366454 A1 | 12/2016 | Tatourian et al. | |
| 2017/0055007 A1* | 2/2017 | Phillips | H04N 21/2353 |
| 2017/0127101 A1 | 5/2017 | Rasool et al. | |
| 2018/0027039 A1 | 1/2018 | Moorthy et al. | |
| 2018/0359500 A1 | 12/2018 | Hasek | |
| 2019/0069000 A1 | 2/2019 | Hou et al. | |
| 2019/0069038 A1 | 2/2019 | Phillips | |
| 2020/0057697 A1* | 2/2020 | Yeung | G06F 9/542 |

* cited by examiner

SYSTEMS, METHODS, AND DEVICES FOR OPTIMIZING STREAMING BITRATE BASED ON MULTICLIENT DISPLAY PROFILES

CROSS-REFERENCE TO RELATED APPLICATION

This application is a continuation of the parent U.S. patent application Ser. No. 16/218,312, filed on Dec. 12, 2018, the content of which is incorporated by reference in its entirety.

TECHNICAL FIELD

The following disclosure generally relates to media streaming and, more particularly, to systems, methods, and devices for optimizing streaming bitrate during multiclient streaming sessions based, at least in part, on display profiles associated with client media receivers.

ABBREVIATIONS

Abbreviations appearing less frequently in this document are defined upon initial usage, while abbreviations appearing with greater frequency are defined below.
ABR—Adaptive Bitrate;
CDN—Content Delivery Network;
DVR—Digital Video Recorder;
GUI—Graphical User Interface;
OS—Operating System;
OTA—Over-The-Air;
OTT—Over-The-Top;
STB—Set-Top Box; and
VOD—Video-On-Demand.

BACKGROUND

The term "streaming video" generally refers to the reception of multimedia content, such as television programming and other audiovisual content, through a communications network at a bitrate enabling presentation of the content in real time as it is received. Streaming video may be viewed live or on-demand and transmitted by, for example, a VOD provider, a remotely-controlled placeshifting device, or a pay television provider delivering television programming via cable, satellite, or Internet (OTT) distribution channels. In the case of VOD or OTT television services, the media content may be stored in a pre-encoded format and distributed to a client media receiver, such as a mobile phone or STB, over a CDN. In the case of placeshifted media, a DVR, STB, or a similar device having placeshifting capabilities and located within a user's residence may encode and transmit selected streaming video to a client media receiver, such as a mobile phone or tablet, operated by the end user.

Media streaming services enhance the ease and convenience with which end users view streaming video content, such as VOD, OTT television, and placeshifted media content. Media streaming services are, however, inherently limited by resource constraints affecting network reliability and bandwidth availability. When network bandwidth becomes overly constrained during a streaming video session, latencies may occur resulting in prolonged buffering and other delays in the presentation of streaming video content. Network latencies can also result in sluggish response times in implementing user-issued commands during a streaming video session, such as channel change commands issued by a user when streaming OTT television content. Various ABR streaming techniques are now widely employed to enhance streaming video performance despite such variances in network bandwidth and other constraining factors. In general, ABR techniques actively adjust encoding parameters (e.g., image resolution and video framerate) in response to variations in network bandwidth, playback device resources, and the like.

Bandwidth constraints are more likely to arise when a streaming media server concurrently or simultaneously delivers separate media streams to multiple playback devices (herein, "client media receivers"). This may occur when, for example, the streaming media server assumes the form of a consumer placeshifting device located in a user's residence or household. In this case, the streaming media server may concurrently provide video-containing media streams to multiple different client media receivers to, for example, allow a first person in the household to view chosen content on a display integrated into or coupled to a first receiver (e.g., a mobile phone or tablet), while a second person in the household views media content on display integrated into or coupled to a second receiver (e.g., television). Should bandwidth constraints arise, both client media receivers may experience a degradation in playback quality. While ABR techniques can be applied to improve playback performance in such instances, the provision of lower bitrate streams, such as streams having decreased resolutions, may be noticeable to end users viewing streaming video content on certain display devices, such as devices having larger display areas and higher resolution capabilities. A similar issue may likewise arise when a streaming media server lacks sufficient capabilities (e.g., due to hardware limitations) to simultaneously encode two or more separate video streams at maximum quality levels and streaming bitrates.

There thus exists an ongoing demand for systems, methods, and devices capable of optimizing streaming bitrate during a multiclient streaming session when bandwidth constraints, server limitations, or other such limiting factors prevent a streaming media server from concurrently encoding segments of all outgoing video streams at the highest possible bitrate. Other desirable features and characteristics of embodiments of the present disclosure will become apparent from the subsequent Detailed Description and the appended Claims, taken in conjunction with the accompanying drawings and the foregoing Background.

BRIEF SUMMARY

Methods are provided for optimizing streaming bitrate during multiclient streaming sessions based, at least in part, on display profiles associated with client media receivers to which different video streams are concurrently provided. The method may be carried-out by a streaming media server in communication with first and second client media receivers over a network. In various embodiments, the method may include establishing at the streaming media server: (i) a first bandwidth allotment threshold based, at least in part, on a first display profile assigned to a first display device associated with the first client media receiver; and (ii) a second bandwidth allotment threshold based, at least in part, on a second display profile assigned to the second display device associated with the second client media receiver. After establishing the first and second bandwidth allotment thresholds, a multiclient streaming session may be initiated. During the multiclient streaming session, the streaming media server encodes segments of first and second video streams at variable bitrates regulated in accordance with the first and second bandwidth allotment thresholds, respectively. Additionally, the streaming media server transmits the encoded segments of the first and second video streams over the network to the first and second client media receivers, respectively, for presentation on the first and second display devices.

In another embodiment, the method includes the step or process of engaging in a multiclient streaming session during which a streaming media server encodes segments of video streams at variable bitrates and transmits the encoded video stream segments over a network to client media receivers for presentation on display devices associated therewith. Prior to engaging in the multiclient streaming session, the streaming media server assigns bandwidth allotment thresholds to the client media receivers based, at least in part, on a total number of client media receivers engaged in the multiclient streaming session and display device types or categories associated with the client media receivers. The streaming media server further modifies the variable bitrates at which the segments of the video streams are encoded during the multiclient streaming session, while limiting the variable bitrates in accordance with the predetermined bandwidth allotment thresholds assigned to the client media receivers. In certain implementations, the method may also include the step or process of adjusting the bandwidth allotment thresholds in response to a change in the total number of client media receivers engaged in the multiclient streaming session at a given period of time. Additionally or alternatively, the streaming media server may determine whether the client media receivers are associated with display device types falling within a common device type category, as selected from a plurality of device type categories; and, when determining that client media receivers are associated with display device types falling within the common device type category, the server may assign equivalent bandwidth allotment thresholds to the client media receivers.

Systems and devices are further provided for optimizing streaming bitrate during multiclient streaming sessions based on display profiles. In an embodiment, a streaming media server is provided containing a processor and a computer-readable storage medium, which stores computer-readable code or instructions. When executed by the processor, the computer-readable code causes the streaming media receiver to perform the operations of: establishing a first bandwidth allotment threshold based, at least in part, on a first display profile assigned to a first display device associated with the first client media receiver; further establishing a second bandwidth allotment threshold based, at least in part, on a second display profile assigned to the second display device associated with the second client media receiver; and initiating a multiclient streaming session after establishing the first and second bandwidth allotment thresholds. During the multiclient streaming session, the streaming media server repeatedly or iteratively encodes segments of first and second video streams at variable bitrates regulated in accordance with the first and second bandwidth allotment thresholds, respectively. The streaming media server also repeatedly transmits the encoded segments of the first and second video streams over the network to the first and second client media receivers, respectively, for presentation on the first and second display devices.

The methods described above and described elsewhere in this document can be implemented utilizing complimentary program products, such as software applications executed on suitably-equipped client media receivers and streaming media servers. Various additional examples, aspects, and other useful features of embodiments of the present disclosure will also become apparent to one of ordinary skill in the relevant industry given the additional description provided below.

BRIEF DESCRIPTION OF THE DRAWING FIGURES

Figure 2:
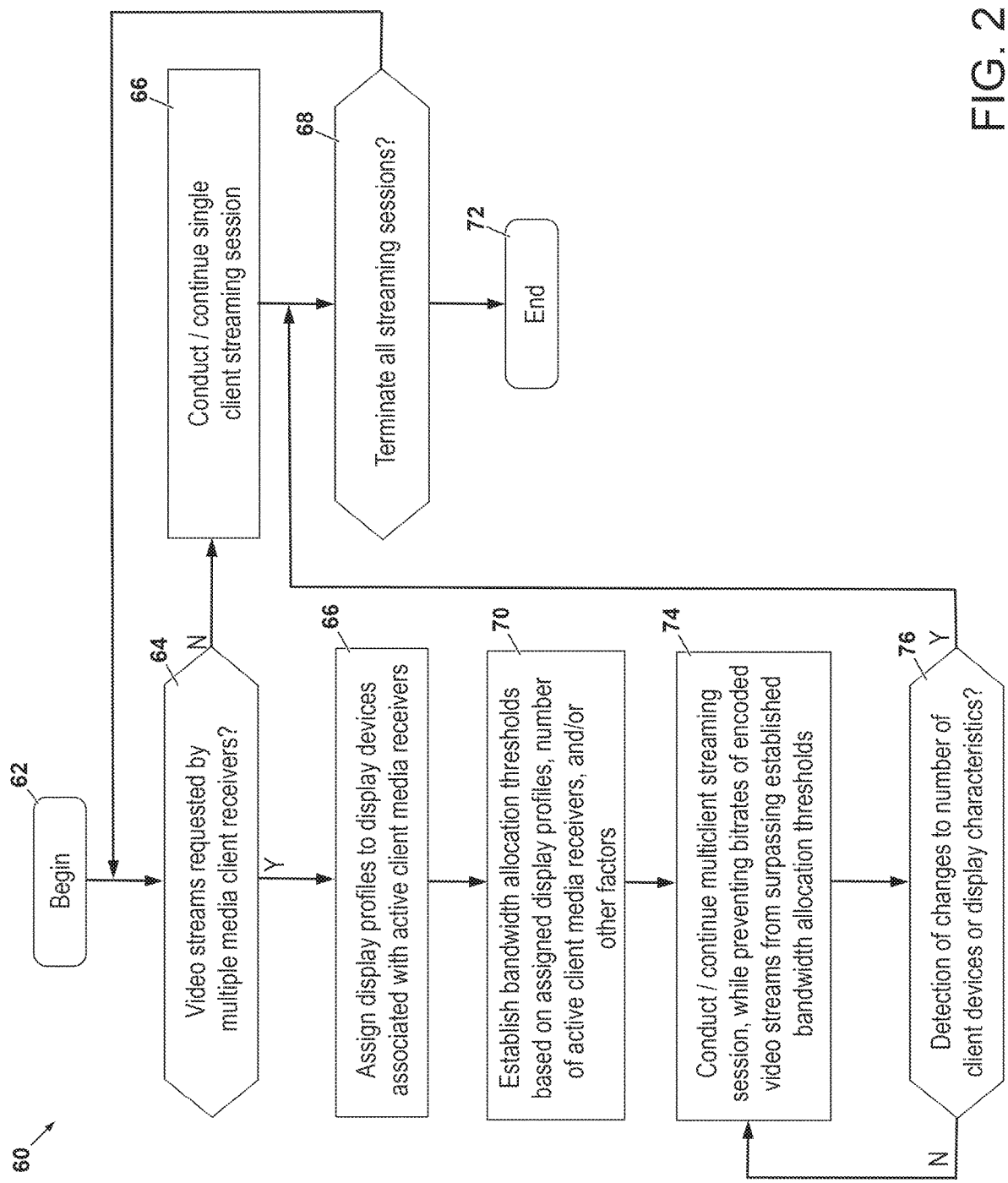

Exemplary embodiments will hereinafter be described in conjunction with the following drawing figures, wherein like numerals denote like elements, and:

FIG. 1 is a schematic illustrating a multi-device streaming media system including a streaming media server, a plurality of client media receivers, and a network over which the streaming media server selectively provides streaming video content to the client media receivers, as illustrated in accordance with an exemplary embodiment of the present disclosure; and FIG. 2 is a flowchart setting-forth a streaming bandwidth allotment process, which may be performed by the streaming media server shown in FIG. 1 to optimize streaming bitrate as a function of display profiles associated with multiple client devices, as further illustrated in accordance with an exemplary embodiment of the present disclosure.

DETAILED DESCRIPTION

The following Detailed Description is merely exemplary in nature and is not intended to limit the invention or the application and uses of the invention. The term "exemplary," as appearing throughout this document, is synonymous with the term "example" and is utilized repeatedly below to emphasize that the description appearing in the following section merely provides multiple non-limiting examples of the invention and should not be construed to restrict the scope of the invention, as set-out in the Claims, in any respect.

As further appearing herein, a display device is considered "associated with" a client media receiver when the display device is utilized to display video content transmitted to the client media receiver, over a network, and from a streaming media server during a streaming video session. As discussed more fully below, a given display device may be integrated into or combine with a client media receiver as a unitary electronic device, such as a smartphone, a tablet, or smart television. Alternatively, a given display device may exist a freestanding or independent display device, such as a television or monitor.

Overview

Systems, methods, and devices are provided for optimizing streaming bitrate during multiclient streaming sessions; that is, streaming media sessions in which a streaming media server concurrently provides separate video-containing media streams to two or more playback devices (herein, "client media receivers"). In various embodiments, the streaming media server may assume the form of a consumer placeshifting device, such as a STB or DVR having placeshifting capabilities. In such embodiments, the streaming media server may concurrently provide different media streams to multiple client media receivers, each associated with (integrated into or operably coupled to) a different display device. By conventional practice, client media receivers typically request video streams at the highest possible quality (maximum resolution and framerate) and, therefore, at the highest possible bitrate during a multiclient streaming session. Further, in legacy approaches to multiclient streaming, the streaming media server attempts to encode, packetize, and transmit each of the video-containing media streams at the highest possible bitrate to cater to the client requests. This results in non-differentiated stream quality between the encoded video streams and, therefore, substantially equivalent bandwidth usage by the client media receivers during the ensuing multiclient streaming session.

While the above-described uniform bitrate share scheme is relatively straightforward, such an invariably uniform division of available bandwidth and processing resources can detract from user viewing experience in certain instances. For example, the viewing experience of users may be degraded when bandwidth constraints arise, preventing concurrent transmission of all outgoing video streams at the highest bitrate. Similarly, in such a conventional bitrate share scheme, user viewing experience may suffer when the capabilities of the streaming media server are insufficient (e.g., due to hardware limitations) to simultaneously encode all requested streams at a maximum quality level or bitrate, as requested by the client media receivers. Consider, for example, the above-introduced scenario in which a first user is viewing streaming content on a first display device (e.g., a television) having a larger display area and greater resolution capabilities, while a second user is viewing streaming content on a second display device (e.g., the display module of a smartphone) having a smaller display size and lower resolution capabilities. In such a scenario, equivalent division of the available bandwidth between the video streams provided to the first and second client media receivers may result in noticeable reductions in stream quality on the first display device (the television) due to the larger display size and higher resolution capabilities of this device. The viewing experience of the user or users viewing the streaming content on the first display device (the television) may be degraded as a result. Furthermore, server resources may be needlessly expended on providing the second media receiver (the smartphone) with a video stream at a maximum bitrate and quality level, potentially exceeding the display capabilities of its associated display device (the screen of the smartphone).

To address the above-described issue and related limitations occurring in the context of multiclient streaming, the streaming media server usefully establishes and applies display profile-dependent bandwidth allotment thresholds during multiclient streaming sessions. In this regard, embodiments of the streaming media server may assign display profiles to each display device associated with a particular client media receiver engaged in a multiclient streaming session with the server at a given juncture in time. In embodiments, the display profiles associated with or corresponding to the client media receivers usefully include information describing the physical characteristics of the display device associated with (that is, utilized to display the media content streamed to) a particular client media receiver. A non-exhaustive list of such physical characteristics includes display device type or category (e.g., whether the display device is properly categorized as, for example, a television or a display module included in a user-carried electronic device, such as a tablet or smartphone), total display screen area, maximum resolution capabilities, and whether the display device is capable of rendering three dimensional content. The streaming media server then utilizes the established display profiles, perhaps in conjunction with other pertinent data (e.g., user-established priority settings, data indicating whether the streamed content contains three dimensional imagery, and/or data indicating when streamed content is presented in a graphical window occupying a fraction of the total display area (herein a "non-maximized graphical window")) to optimize bitrate sharing during a multiclient streaming session.

In embodiments, the streaming media server may assign the above-described display profiles based upon prestored data associated with the client media receivers, based upon data received from one or more of the client media receivers and/or their corresponding display device during a given multidevice streaming session, based upon data stored in memory as a default display profile, or any combination thereof. The streaming media server then assigns bandwidth allocations or allotment thresholds to the client media receiver to the client media receivers or, more accurately, to the video streams provided to the client media receivers. The server assigns such bandwidth allotment thresholds as a function of the established display profiles and, in certain cases, one or more secondary parameters; e.g., user-specified priority settings, whether the media stream contains two dimensional or three dimensional video content, and/or other such factors as discussed below. Following this, the streaming media server conducts the ensuing multiclient streaming session, applying ABR adjustments as appropriate, while preventing the respective bitrates of the video streams from exceeding the bandwidth allotment thresholds assigned to each video stream. Further discussion in this regard is set-forth below in conjunction with FIG. 2. First, however, a general overview of a multiclient streaming media system including a streaming media server suitable for performing various aspects of the present disclosure will be described in connection with FIG. 1.

Example of Streaming Media System Including a Streaming Media Server Suitable for Performing Embodiments of the Present Disclosure FIG. 1 schematically illustrates an exemplary streaming media system 10, including a streaming media server 12 suitable for supporting in multiclient streaming sessions, while applying intelligent, display profile-based bitrate optimization schemes in the manner discussed herein. Such multiclient streaming sessions may occur between streaming media server 12 and two or more multiple client media receivers 14, as schematically shown in FIG. 1 and described below. In addition to streaming media server 12 and client media receivers 14, streaming media system 10 further includes a communications network 18 over which streaming video sessions are conducted. Communications network 18 may encompass any number of digital or other networks enabling bidirectional signal communication between server 12 and receivers 14 utilizing common protocols and signaling schemes. Communications network 18 can include one or more open CDNs, Virtual Private Networks (VPNs), Local Area Networks (LANs), Wide Area Networks (WANs), the Internet, and various other communications networks implemented in accordance with TCP/IP protocol architectures, User Datagram Protocol (UPD) architectures, or other communication protocols. In embodiments, communications network 18 may also encompass a cellular network and/or any other pubic or private networks.

During a given streaming video session, streaming media server 12 provides streaming video content to one or more of client media receivers 14. A multiclient streaming session occurs when streaming media server 12 concurrently or simultaneously provides streaming video content to multiple client media receivers 14 over network 18. Generally, streaming media server 12 may provide such streaming video content by encoding, packetizing, and transmitting user-selected video content over communications network 18 to one or more of client media receivers 14 as separate video-containing media streams. Encryption can be applied, if desired. The streaming video content will often include accompanying audio content, although this is not strictly necessary. Each client media receivers 14 then receives decrypts (if needed), and decodes the streaming video content as the content is received. Client media receivers 14 then utilize the newly-decoded content to generate video output signals, which are supplied to corresponding display devices 20 for viewing by end users; the term "output signals," as appearing herein, defined in a broad sense and not precluding that a given display device (e.g., a display module or screen) may be integrated with its associated client media receiver as a unitary or single electronic device, as discussed below.

For illustrative clarity, only two client media receivers 14(a) and 14(b) are shown in the example of FIG. 1. However, as indicated by symbol 16, streaming media server 12 can concurrently provide video-containing media streaming to any practical number of client media receivers 14, depending upon the capabilities of server 12 and other factors. Further, for ease of explanation, client media receivers 14 are depicted as containing the same or similar generalized components in the schematic of FIG. 1. Thus, any description directed toward a particular client media receiver should be understood to apply equally to the other client media receivers 14, unless otherwise specified. Further, for clarity, the above-introduced nomenclature (i.e., the addition of the identifier (a) or (b) to certain reference numerals) is utilized to distinguish between components contained in client media receiver 14(a) and client media receiver 14(b), as appropriate, in the following description.

As previously indicated, a given display device 20 can be integrated into or combined with its corresponding client media receiver 14 as a unitary assembly or electronic device in certain instances. This may be the case when, for example, a particular client media receivers 14 assumes the form of a mobile phone, a tablet, a laptop computer, or a similar electronic device having a dedicated display screen. So too may this be the case when a given display device 20 and its corresponding client media receiver 14 are integrated as a smart television; that is, a television containing an integrated receiver suitable for performing the functions described herein. In other instances, a given display device 20 may assume the form of an independent or distinct device, such as a freestanding monitor or television, which is operably connected to its corresponding client media receiver 14 over a wired or wireless connection. In this latter case, a given client media receiver 14 may assume the form of a consumer media receiver device (e.g., an STB or DVR) having placeshifting capabilities in embodiments, with the receiver 14 then outputting a video signal to its corresponding display device 20 in the form of a freestanding television or monitor. Further discussion in this regard is provided below in the context of exemplary scenarios in which display device 20(a) assumes the form of television (which may or may not be integrated with client media receiver 14(a)), while display device 20(b) assumes the form of a display module integrated into client media receiver 14(b) as a smartphone, a tablet, or other mobile (user-carried) electronic device.

Streaming media server 12 can assume the form of any device, system, or component suitable for obtaining video-containing content from one or more content sources 22, encoding the content utilizing one or more encoder modules 24 under the command one or more control modules 26, and transmitting the encoded content to client media receivers 14 over communications network 18. Content sources 22 may include, for example, content providers and aggregators external to streaming media server 12 and in communication with streaming media server 12 over communications network 18. Content sources 22 can also include any number and type of storage mediums accessible to streaming media server 12 in which the video content subject to streaming is stored. Content sources 22 can also include an antenna, receiver, or the like (identified in FIG. 1 by symbol 28) for receiving media content, such as television programming, over a satellite, cable, or over-the-air distribution network.

Modules 24, 26 contained in streaming media server 12 can be implemented utilizing software, hardware, firmware, or any combination thereof. For example, modules 24, 26, maybe implemented utilizing software or firmware embodied by code or computer-readable instructions stored within memory 30 and executed by at least one processor 32 further contained in streaming media server 12. As illustrated, memory 30 generally depicts the various storage areas or mediums contained in server 12 and may encompass any number and type of discrete memory sectors or types. In embodiments, processor 32 may be a microprocessor, which is realized along with other non-illustrated components included in server 12 as a system-on-a-chip. The encoded video streams will often contain both video and audio component streams, which may be combined with other streaming data including packet identification data. Any currently-known or later-developed packetized format can be employed by streaming media server 12 including, but not limited to, Moving Picture Experts Group (MPEG), QUICKTIME®, WINDOWS® MEDIA, and other formats suitable for transmission over communications network 18.

Streaming media server 12 may further contain various other standardized components including, for example, any number and type of I/O features 34 enabling bidirectional communication with client media receivers 14 (and, perhaps, other nodes or devices) over network 18. Additionally, and as previously noted, streaming media server 12 may be capable of functioning as a receiver, such a home media receiver. In this case, server 12 may receive, decode, and generate output signals for media content, which are then presented on a display device 36 (e.g., a home television set or monitor) for viewing by end users. For example, in certain implementations, streaming media server 12 may receive OTA television content, as indicated in FIG. 1 by antenna symbol 28, and provide selected channels to client media receivers 14. Further, in such instances, server 12 may potentially supply selected OTA television channels for viewing on display devices 20 as placeshifted content in accordance with user commands entered via client media receivers 14. In other embodiments, streaming media receiver 14 may receive content from other sources, such as a (e.g., subscription-based) streaming OTT linear television service; and potentially combine such OTT television content with the OTA television content received via antenna 28 in a single GUI or channel selection guide.

As further shown in FIG. 1, client media receivers 14 each contain at least one processor 38, memory 40, and I/O features 42. For a given client media receiver 14, processor 38 is configured to selectively execute software instructions stored in memory 40 during receiver operation and, in accordance with such instructions, exchange data over network 18 utilizing I/O features 42. Accordingly, I/O features 42 can include a network interface, an interface to mass storage, an interface to display devices 20, and/or various types of user input interfaces. In embodiments, client media receivers 14 may execute a software program or application 44 directing the hardware features of client media receivers 14 to perform the functions described herein. Application 44 suitably interfaces with processor 38, memory 40, and I/O features 42 via any conventional operating system 46 to provide such functionalities. Software application can be placeshifting application in embodiments wherein streaming media server 12 assumes the form of a STB, DVR, or similar electronic device having placeshifting capabilities and typically located within a user's residence, office space, or the like.

For each client media receiver 14, software application 44 suitably includes control logic adapted to process user input, receive video-containing media streams 48, 50 from streaming media server 12, decode the received media streams, and provide video output signals to corresponding display devices 20. As indicated in FIG. 1, streaming media server 12 may provide a first video stream 48 to client media receiver 14(*a*), while concurrently providing a second video stream 50 to client media receiver 14(*b*) during a given multiclient streaming session. Depending upon its capabilities, streaming media server 12 may also provide any number of additional video streams, concurrently or successively, to other non-illustrated receivers 16 included in client media receivers 14. In various embodiments, applications 44 may then decode the appropriate content streams 48, 50 received from streaming media server 12 utilizing a decoding module implemented as, for example, specialized hardware or in software executing on processor 38. The decoded content is supplied to a presentation module, which generates corresponding output signals transmitted to the appropriate display device 20.

To establish a streaming video session, streaming media server 12 receives an initial transmission from at least one of client media receivers 14 via network 18. This initial transmission may include data identifying the video-containing media content desirably streamed to a particular client media receiver 14 and other information, such as data supporting authentication of streaming media server 12 and client media receiver or receivers 14 engaging in a streaming session. Additionally, in embodiments in which streaming media server 12 assumes the form of a consumer placeshifting device, such as a STB or DVR located in the residence of an end user or at a similar location, control commands or signals 52, 54 may be selectively transmitted from any given one of receivers 14, over network 18, and to server 12, with the signals 52, 54 containing instructions to remotely operate the placeshifting device. Further, in embodiments, a given client media receiver 14 may further transmit information identifying or aiding in the identification of pertinent physical characteristics describing a corresponding display device 20 (e.g., display device type, resolution capabilities, display size, etc.) when initially requesting or after engaging in a streaming video session with streaming media server 12.

During a multiclient streaming session, streaming media server 12 executes bitrate share logic 56 residing in memory 30 to implement the below-described display profile-based bitrate optimization schemes. In so doing, streaming media server 12 assigns or establishes bandwidth allotment thresholds for each of the outgoing video streams (e.g., streams 48, 50 shown in FIG. 1) based, at least in part, on display profiles associated with the client media receivers 14 to which video streams are provided. As generically indicated in FIG. 1, bitrate share logic 56 may be implemented as part of control module 26, whether as software, hardware, or firmware. In other embodiments, bitrate share logic 56 may be separate from, but operably coupled to, control module 26. Streaming media server 12 may establish a number of display profiles, each associated with a different client media receivers 14, utilizing information provided by client media receivers 14 when initially requesting video streams 48, 50; utilizing information provided by client media receivers 14 in response to queries transmitted to receivers 14 by streaming media server 12; and/or utilizing information derived in another manner, noting that a default setting can be assigned to any given display profile if adequate information to otherwise establish a given display profile is unavailable. Exemplary methods, which are suitably carried-out by streaming media server 12 in implementing such display profile-based bitrate optimization or share schemes, will now be described in conjunction with FIG. 2.

Exemplary Streaming Bandwidth Allotment Methods for Bitrate Sharing During Multiclient Streaming Sessions FIG. 2 is a flowchart setting-forth a streaming bandwidth allotment method 60 carried-out by a streaming media server, such as streaming media server 12 (FIG. 1), in accordance with an exemplary embodiment of the present disclosure. In the illustrated example, streaming bandwidth allotment method 60 includes a number of process steps identified as STEPS 62, 64, 66, 68, 70, 72, 74, 76. Depending upon the particular manner in which bandwidth allotment method 60 is implemented, each process step generally illustrated in FIG. 2 may entail a single computer-implemented process or multiple sub-processes. Further, the steps illustrated in FIG. 2 and described below are provided by way of non-limiting example only. In alternative embodiments of streaming bandwidth allotment method 60, additional process steps may be performed, certain steps may be omitted, and/or the illustrated steps may be performed in alternative sequences.

Streaming bandwidth allotment method 60 commences at STEP 62. In certain embodiments, streaming bandwidth allotment method 60 may commence in response to receipt of user input requesting streaming transmission of selected media content to at least one of client media receivers 14. Alternatively, streaming bandwidth allotment method 60 may commence upon initiation of a streaming video session; e.g., after establishment of a bidirectional channel through network 18 over which one or more of client media receivers 14 and streaming media server 12 communicate. Mutual authentication of receiver(s) 14 and server 12 may be performed and encryption applied, as desired. In accordance with commands received from a given client media receiver 14, streaming media server 12 (FIG. 1) then obtains and prepares selected video-containing media content for transmission to one or more of client media receivers 14 over network 18. The streaming video content can be obtained directly from any of the content sources 22; from memory contained within or otherwise accessible to streaming media server 12 when assuming the form of a DVR, STB, or other device having placeshifting capabilities; or from another source. When functioning as a placeshifting device, streaming media server 12 may capture, encode, encrypt (if needed), packetize, and transmit user-selected content to the appropriate client media receiver(s) 14 as a live content stream. Further, in such embodiments, network 18 may include or assume the form of a LAN, such as a home WIFI® network, established in a user's residence in which server 12 is located.

During STEP 64 of method 60, streaming media server 12 determines whether separate video streams are currently requested from multiple client media receivers 14. If only a single client media receiver 14 currently requests initial or continued transmission of a video stream from server 12, streaming media server 12 provides or continues to provide the requested video stream to the receiver 14 (STEP 66). Concurrently or shortly thereafter, streaming media server 12 further determines whether the current single-client streaming session should continue or, instead, should be terminated (STEP 68) at the present juncture in time. If determining that the single-client streaming session should terminate, streaming media server 12 progresses to STEP 72 of streaming bandwidth allotment method 60, and the current iteration of method 60 concludes. Otherwise, streaming media server 12 returns to STEP 64 of method 60 and again determines whether a multiclient streaming session should be initiated. Repeating STEPS 64, 66, 68 of method 60 thusly, streaming media server 12 conducts a single-client streaming session in the typical manner, usefully applying ABR as appropriate, until either: (i) termination of the single client streaming session is warranted (STEPS 68, 72), or (ii) until at least one additional client media receiver 14 initiates concurrent video streaming from the streaming media server 12.

When determining that separate video streams are concurrently requested by at least two client media receivers 14, streaming media server 12 progresses to STEP 66 of streaming bandwidth allotment method 60. During STEP 66 of method 60, streaming media server 12 assigns display profiles to the display devices associated with client media receivers 14, which are currently receiving or which desirably receive encoded video streams from server 12. In the relatively simple example of FIG. 1, streaming media server 12 concurrently provides two video-containing media streams (video streams 48, 50) to two client media receivers (receivers 14(a), 14(b)). In this case, streaming media server 12 may assign a first display profile to display device 20(a) (and, more generally, to receiver 14(a)) and a second display profile to display device 20(b) (and, more generally, to receiver 14(b)). As noted above, the assigned display profile can include a single parameter or data field in embodiments; e.g., a single classification based upon display device type or category, display size (e.g., expressed as a total display area, as of length and width of the display screen, or in another format), and/or display resolution (e.g., 1080P, 4K, 8K, or the like). Alternatively, in more complex embodiments, the assigned display profile can include two or more separately-specified parameters, such as a first parameter relating display size, a second parameter relating display resolution, and any number of additional parameters relating other characteristics pertaining to the display device at issue (e.g., whether the display device is capable of presenting three dimensional content).

During STEP 66 of streaming bandwidth allotment method 60, streaming media server 12 assigns or establishes the display profiles associated with each of the client media receivers 14 (and, more specifically, the display devise 20) engaged in the multiclient streaming session. In embodiments, streaming media server 12 establishes the display profiles utilizing any pertinent information provided by client media receivers 14, which describes or otherwise pertains to the physical characteristics of display devices 20. In certain implementations, one or more of client media receivers 14 may transmit associated display data over network 18 to streaming media server 12, with the display data indicating the receiver or display device falls into a particular device category. For example, in one approach, one or more receivers 14 may transmit display data to server 12 indicative of receiver device type or category from which the associated display device type can be inferred (also considered "display data") in the context of the present disclosure. By way of illustration, client media receiver 14(a) may transmit information over network 18 and to streaming media server 12 identifying receiver 14(a) as a smartphone, tablet, laptop computer, or smart television, in which case server 12 may infer that display device 20(a) is an integrated display module of the identified receiver device type, and then proceeding accordingly. Comparatively, client media receiver 14(b) may transmit data over network 18 and to streaming media server 12 identifying receiver 14(b) as an STB or DVR, in which case server 12 may infer that display device 20(b) is a freestanding television or monitor.

Similarly, in other embodiments, receivers 14 may provide transmission to server 12 containing display data directly identifying the category in which the associated display devices 20 are appropriately classified. The identified categorization of a display device may then be utilized by server 12 to construct or assign a display profile associated with the corresponding display device-receiver pair. In other embodiments, a unique device (receiver) identifier, MAC address, or the like may be transmitted from each receiver 14 to streaming media server 12 and then utilized in creating or constructing the display profiles. For example, in this latter instances, streaming media server 12 may retrain a two dimensional lookup table or other data structure in memory 30, which stores such unique receiver identifies along with corresponding display device types as entered into memory 30; e.g., by a user during a setup phase or otherwise utilizing a user interface of server 12. Server 12 may then utilize such a stored data structure to determine the display device type or category corresponding to the unique identifying information transmitted from receivers 14 when initiating or during the course of the multiclient streaming session.

The above-described identifying information or data may be transmitted from client media receivers 14 over network 18 in conjunction with the initial request to establish a streaming video session with server 12; or, instead, maybe transmitted from client media receivers 14 in response to queries for this information initially transmitted to receivers 14 from streaming media server 12 over network 18. Further, in some implementations, client media receivers 14 may transmit (automatically or in reply to server queries) additional data describing the characteristics of display devices 20, such as data specifying the maximum resolution capabilities (e.g., 1080P, 4K, 8K, or other resolution standard), display size (screen area) of any given display device 20, and/or whether a given display device 20 is capable of rendering three dimensional content. In still other instances, and as indicated above, the streaming media server 12 may establish such display profile characteristics during an initial setup phase based upon user data, such as user data entered via any one of receivers 14 executing software applications 44. A prioritization scheme or hierarchy can also be established by the user in embodiments and stored at streaming media server 12, with server 12 then duly weighing any user-assigned prioritizations in setting bitrate share proportions (that is, the below-described "bandwidth allocation thresholds") during STEP 70 of method 60. Finally, in certain scenarios, streaming media server 12 may not be provided with or may otherwise be unable to obtain adequate identifying information pertaining to either a given client media receiver 14 or its corresponding display device 20. In such instances, streaming media server 12 may assign a default display profile to the display device 20 associated with such an unidentified client media receiver 14.

Progressing to STEP 70 of streaming bandwidth allotment method 60, streaming media server 12 next establishes bandwidth allocation thresholds based, exclusively or at least in substantial part, on the display profiles assigned to each client media receiver-display device pair. Such bandwidth allocation threshold may be expressed as, for example, a percentage of the bandwidth available for video streaming. The available bandwidth for video streaming may be a static value or, instead, a dynamic value that is repeatedly adjusted by streaming media server 12 in conjunction with variations in systems resources, processing load, and/or other such factors. Streaming media server 12 also usefully considers the number of active client media receivers 14 when determining the bandwidth allocation thresholds; that is, the number of receivers 14 to which streaming media server 12 provides separate encoded video streams. Further, in certain cases, the streaming media server 12 may also consider any number of secondary factors, to the extent such secondary factors are known, when defining or constructing the display profiles, as further discussed below.

As just stated, the streaming media server 12 can consider any number of secondary factors (in addition to the display profiles and the number of active receivers) when setting or modifying the bandwidth allocation thresholds during STEP 70 of method 60. Such secondary factors can include the format of the video-containing content; e.g., whether three dimensional content is currently streamed to a display device 20, which is capable of displaying such content in a three dimensional format. Additionally or alternatively, such secondary factors can include dynamic information pertaining to the display of the streamed video content; e.g., whether the streamed video content is presented in a graphical window occupying a fraction of the total available display area of a given display device 20 (herein, a "non-maximized graphical window") with this information contained in signals transmitted from the corresponding receiver 14, over network 18, and to server 12. Streaming media server 12 may receive data transmitted from either of client media receivers 14, over network 18, and to server 12 indicative of current size (e.g., area or dimensions) of the non-maximized graphical window in which video stream 48 or 50 is presented. Server 12 may then establish or adjust the corresponding bandwidth allotment thresholds based upon data indicative of the current size of the non-maximized graphical window rather than the size of the display screen itself.

In certain instances, when establishing or modifying the bandwidth allocation thresholds during STEP 70 of streaming bandwidth allotment method 60, streaming media server 12 may determine that an auxiliary display device is currently utilized present the streamed content rather than the principal display device associated with a particular client media receiver 14; e.g., as may occur when a mobile (user-carried) electronic device wirelessly casts or otherwise outputs its video signal for display on another display screen, such as a television or monitor having a larger display screen and greater resolution capabilities. When available, such information may be duly considered by streaming media server 12 in assigning or modifying the corresponding bandwidth allotment threshold; e.g., server 12 may construct the display profile of the receiver 14 an issue to indicate that display type is a television, has higher resolution capabilities, and/or has a larger display screen size rather than the display module of a mobile device in such instances. Finally, if any user-established preferences or a priority scheme has been established for bitrate sharing, this may also be considered by streaming media server 12 in assigning the bandwidth allocation thresholds during STEP 70 of method 60, as further discussed below.

After establishing (or modifying) the bandwidth allocation thresholds during STEP 70 of streaming bandwidth allotment method 60, streaming media server 12 initiates or continues the multiclient streaming session while preventing the bitrates of the video streams from exceeding their corresponding bandwidth allotment thresholds (STEP 76). Streaming media server 12 may encode the video streams at varying quality levels in accordance with any chosen ABR scheme, e.g., by generating variant streams or streamlets having modified bitrates due to changes in the resolution, frame rate, color depth, and/or other such encoding parameters. At the same time, streaming media server 12 encodes segments of the video streams at encoding parameters ensuring that the bitrate of any given video stream is maintained below its corresponding bandwidth allotment threshold. Thus, during the multiclient streaming session, the streaming media server 12 may provide streams of varying qualities to client media receivers 14 by applying ABR techniques while regulating respective variable bitrates of the streams in accordance with the established bandwidth allotment thresholds.

Continuing the discussion above, client media receivers 14($a$), 14($b$) may each attempt to acquire streaming content at a maximum streaming bitrate; however, bandwidth constraints may occur, or capability limitations of streaming media server 12 may preclude the simultaneous encoding of two (or more) streams at a maximum quality level or the highest possible bitrate, as previously discussed. Therefore, in such instances, streaming media server 12 generates and transmits a reduced bitrate stream to receivers 14($a$), 14($b$) in accordance with the previously-assigned bandwidth allocation thresholds, thereby maintaining the stream bitrates below their corresponding bandwidth allocations or thresholds. Intelligent distribution of available bandwidth is consequently provided, which considers the display capabilities of the display devices associated with client media receivers 14($a$), 14($b$) to optimize the viewing experience of end users operated receivers 14($a$), 14($b$) under such conditions.

With continued reference to FIG. 2, at STEP 76 of method 60, streaming media server 12 determines whether any changes have occurred to either: (i) the number of active client media receivers 14 requesting streaming content from streaming media server 12, or (ii) to parameters impacting the previously-assigned bandwidth allotment thresholds. In the latter regard, a previously-assigned bandwidth allotment threshold may be varied in certain instances. For example, a bandwidth allotment threshold may be adjusted or modified if streaming media server 12 determine that a given client media receiver 14 has now supplied its video output signal to a new display type; e.g., as may occur when a user transitions from viewing content on the screen of a mobile device to casting or wirelessly transmitting the content to a freestanding television or monitor. Alternatively, a bandwidth allotment threshold may be adjusted should streaming media server 12 determine that the streaming video content is presented in a GUI window, which has been resized such that that the change in the area of the window surpasses a preestablished threshold stored in memory 30 of server 12. In such embodiments, the appropriate client media receiver 14 may transmit data to streaming media server 12 indicative of such changes potentially affecting the display profile, e.g., data indicating the dimensions or area of a newly-resized GUI window in which the video content is displayed. Streaming media server 12 then updates the assigned display profile and bandwidth allotment threshold accordingly (STEP 66), returns to STEP 74 of streaming bandwidth allotment method 60, and continues the multiclient streaming session as described above.

In other embodiments, such modifications or changes to the assigned display profiles may not be performed. In this latter case, the streaming media server 12 may only determine whether there has been a change in the number of active client media receivers 14 receiving streaming content during STEP 76 of method 60; and, if no such change is detected, server 12 may return to STEP 74 and continue the multiclient streaming session. Otherwise, the streaming media server 12 may progress to STEP 68 of method 60, and determine whether the current streaming session should be terminated, as previously discussed. If determining that the current streaming session should continue, streaming media server returns to STEP 64, and the above-described process steps repeat or loop. Accordingly, should a third client media receiver 14 requests streaming video content in conjunction with client media receivers 14(a), 14(b), the streaming media server 12 may progress through STEPS 66, 70, 74 to assign a display profile-based bandwidth allocation threshold to the third client media receiver 14. Alternatively, if one of client media receivers 14(a), 14(b) no longer request streaming video content from server 12, streaming media server 12 may instead progress to STEPS 64, 66 and continue a single device streaming session with the appropriate receiver 14(a), 14(b). In this manner, the streaming media server 12 may establish and modify the streaming bandwidth allocation thresholds (limiting values) in response to changes in the number of client media receivers 14 requesting streaming content at a given juncture in time.

Streaming media server 12 can employ various different bitrate share schemes for assigning or establishing bandwidth allotment thresholds based exclusively, principally, or at least partially on the display profiles associated with client media receivers 14 to which server 12 provides concurrent video streams during a multiclient streaming session. As appearing below, TABLE 1 presents a relatively simple exemplary bandwidth allotment scheme, which may be applied by streaming media server 12 during STEPS 66, 70 of streaming bandwidth allotment method 60 in certain implementations. In the example below, bitrate sharing schemes for two client media receivers 14 are set-forth, with consideration given to two input parameters: (i) the number of client media receivers currently engaged in the streaming video session, and (ii) the display device type (or, more generally, receiver device type or category) assigned to each client media receiver.

TABLE 1

EXAMPLE OF SINGLE FACTOR BANDWIDTH ALLOTMENT SCHEME

| Case | Receiver 1: Associated Display Type | Receiver 2: Associated Display Type | Bitrate Share Logic | User Experience Improvement |
|---|---|---|---|---|
| 1 | Display Module of Mobile Device | Display Module of Mobile Device | 50% bandwidth allotted to both devices (unless otherwise specified by user-established priority settings) | |
| 2 | TV Screen | Display Module of Mobile Device | Greater bandwidth allotment (e.g, 70%) to device 1 (TV); lesser bandwidth allotment (e.g., 30%) to device 2 (mobile device) | Improved viewing experience as higher quality stream provided to higher resolution/larger display device |
| 3 | Display Module of Mobile Device | TV Screen | Lesser bandwidth allotment (e.g., 30%) to device 1 (mobile device); greater bandwidth allotment (e.g., 70%) to device 2 (TV) | Improved viewing experience as higher quality stream provided to higher resolution/larger display device |
| 4 | TV Screen | TV Screen | 50% bandwidth allotted to both devices (unless otherwise specified by user-established priority settings) | |
| 5 | Display Module of Mobile Device | | 100% bandwidth allotted to single device | |
| 6 | TV Screen | | 100% bandwidth allotted to single device | |

As can be seen, in the example set-forth above, the streaming media server 12 assigns bandwidth allotment threshold based upon display device type (as may be inferred from receiver type) and the number of receivers engaged in a streaming session at a particular juncture of time. Further, two possible selection options or classifications are provided for display device type: display module of a mobile device (synonymous with "user-carried electronic device" herein) or television screen. Such possibilities can be stored within memory 30 of the streaming media server 12 utilizing a two dimensional lookup table or other data structure. Thus, employing such an approach, streaming media server 12 may assign a particular display device 20 correspondings to a given client media receiver 14 (e.g., the display device 20(a) corresponding to receiver 14(a)) the profile of "MOBILE DEVICE," if, for example, server 12 receives display data from client media receiver 14(a) identifying receiver 14(a) as a smartphone, tablet, a wearable device, or other electronic device carried on a user's person. Conversely, streaming media server 12 may assign the display device 20 correspondings to another client media receiver 14 (e.g., the display device 20(b) to which receiver 14(b) provides a video signal) the profile of "TELEVISION," if identifying client media receiver 14(b) as an STB or a smart television; e.g., a television having an integrated WIFI® receiver. Again, such a classification can be made in response to display data transmitted to server 12, over network 18, and from client media receiver 14(b); by recalling such information from memory 30 utilizing a unique identifier associated with client media receiver 14(b); or in another suitable manner.

In the example set-forth in TABLE 1 above, only single parameter and two playback receiver combinations are considered. During a single-client streaming session, streaming media server 12 assigns a bandwidth allocation threshold of 100% to the sole client media receiver 14 to which a video stream is provided, regardless of the device type specified by the assigned display profile (CASES 5 and 6 above). Conversely, during a multiclient streaming session, streaming media server 12 assigns an equivalent bandwidth allocation threshold (50%) when simultaneous streaming to two client media receivers 14 associated with display devices of the same device type or category, as specified by the display profiles (CASES 1 and 4 above). Lastly, streaming media server 12 assigns non-equivalent bandwidth allocation thresholds when concurrently streaming to two client media receivers 14 of disparate device types and associated with differing display profiles (CASES 2-3 above). Specifically, in this latter case, streaming media server 12 assigns a higher bandwidth allocation threshold ($BW_{T\_1}$) to the display profile/device type having a larger display screen (television), and a lower bandwidth allocation threshold ($BW_{T\_2}$) to the display profile or device type having a smaller display screen (mobile device). As suggested in TABLE 1, $BW_{T\_1}$ and $BW_{T\_2}$ may be assigned values of about 30% and about 70%, respectively, of the maximum available bandwidth in an embodiment; however, this is merely one possibility and will vary in other implementations.

In further embodiments, streaming media server 12 may apply more complex bandwidth allotment schemes during STEPS 66, 70 of streaming bandwidth allotment method 60. For example, in other instances, the display profile may only specify display device type, as described above; however, more device categories or classification can be listed distinguishing device type by display size and/or maximum resolution capabilities, such as (and listed in the order of bandwidth prioritization) maximum resolution television, moderate resolution television, tablet (or laptop computer), and smartphone. Also, combinations of three or more client devices engaged in a multiclient streaming session may be considered, with predetermined bandwidth allocation thresholds specified in a multidimensional lookup table or other data structure stored in memory 30 of the streaming media server 12, as previously described. Algorithms or weighting systems can also be applied to arrive at the bandwidth allocations in certain implementations. So too may server 12 optionally consider user-created priority settings in determining the bandwidth allocations; e.g., CASES 1 and 4 in TABLE 1 above, a higher bandwidth allotment threshold (e.g., 60%) may be assigned to a first device having a higher user-assigned prioritization ranking over a second device of the same type, but having a lower prioritization ranking. In still other embodiments, additional secondary factors may be considered, such as the maximum resolution of the streamed content and/or whether the streamed content has a three dimensional or two dimensional format. Various other bandwidth allotment schemes are also possible and within the scope of the present disclosure.

CONCLUSION

The foregoing has thus provided systems, methods, and devices for optimizing streaming bitrate during multiclient streaming sessions based, at least in part, on established display profiles associated with client devices or receives to which video streams are concurrently transmitted. Embodiments of the streaming media server establish and apply display profile-dependent bandwidth allotment thresholds for client media receivers during a multiclient streaming session. The streaming media server can employ various different bitrate share schemes for assigning or establishing bandwidth allotment thresholds, as described above. In so doing, the user viewing experience is enhanced in instances in which one or more users view content streamed from a server on a first client media receiver (e.g., a smartphone or tablet) having lesser display demands, while one or more users simultaneously view content streamed from the server on a client media receiver (e.g., a television) having greater display demands. Further, in at least some instances, processing loads placed on the streaming media server may also be favorably reduced during the often computationally-intensive task of providing concurrent multiclient streaming to two or more client media receivers.

The above-described methods may be carried out utilizing a streaming media server, first and second client media receivers, and first and second display devices to which the first and second client media receivers provide video output signals, respectively. In various embodiments, the method includes the step or process of creating, at the streaming media server, a first display profile for the first display device, and a second display profile to the second display device. The streaming media server determines a first bandwidth allotment threshold for a first video stream based on the first display profile, while further determining a second bandwidth allotment threshold for a second video stream based on the second display profile. The streaming media server then concurrently transmits: (i) the first video stream over the network and to the first client media receiver for presentation on the first display device, while preventing a bitrate of the first video stream from exceeding the first bandwidth allotment threshold; and (ii) the second video stream over the network and to the second client media receiver for presentation on the second display device, while preventing a bitrate of the second video stream from exceeding the second bandwidth allotment threshold.

In other embodiments, the method may include establishing at the streaming media server: (i) a first bandwidth allotment threshold based, at least in part, on a first display profile assigned to a first display device associated with the first client media receiver; and (ii) a second bandwidth allotment threshold based, at least in part, on a second display profile assigned to the second display device associated with the second client media receiver. After establishing the first and second bandwidth allotment thresholds, a multiclient streaming session may be initiated. During the multiclient streaming session, the streaming media server encodes segments of first and second video streams at variable bitrates regulated in accordance with the first and second bandwidth allotment thresholds, respectively. Additionally, the streaming media server transmits the encoded segments of the first and second video streams over the network to the first and second client media receivers, respectively, for presentation on the first and second display devices.

Continuing the description of the foregoing paragraph, embodiments of the method may further include the steps or processes of receiving, at the streaming media server, display data transmitted over the network from the first client media receiver. The streaming media server may then define or assign the first display profile based, at least in part, on the display data received from the first client media receiver. In such embodiments, the display data may specify one or more of the following: (i) a display device category in which the first display device is classified (e.g., whether the first display device is a television or a user-carried electronic device), (ii) a maximum resolution of the first display device, and a screen size resolution of the first display device. Additionally or alternatively embodiments of the method may further include the steps of receiving, at the streaming media server, data uniquely identifying the first and second client media receivers, and utilizing the data to recall user-specified display profiles for the first and second client media receives from memory of streaming media server.

While several exemplary embodiments have been presented in the foregoing Detailed Description, it should be appreciated that a vast number of alternate but equivalent variations exist, and the examples presented herein are not intended to limit the scope, applicability, or configuration of the invention in any way. On the contrary, various changes may be made in the function and arrangement of the various features described herein without departing from the scope of the claims and their legal equivalents.

What is claimed is:

1. A method for configuring transmission capacity carried-out by a streaming media server in communication with a set of client media receivers over a network, the method comprising:
   establishing at the streaming media server a first and a second bandwidth capacity between the set of client media receivers comprising at least a first and a second client media receiver:
   configuring a first display profile of the first client media receiver based on a first plurality of display parameters including a first display size and a first display resolution;
   configuring a second display profile of the second client media receiver based on a second plurality of display parameters including a second display size and a second display resolution;
   displaying, in a user interface generated by the streaming media server, a set of display profiles identifying at least the first and second client media receivers, the set of display profiles comprising the first display profile for the first client media receiver and the second display profile for the second client media receiver,
      wherein the first and second client media receivers are displayed with display data based on the first and second display parameters for a multiclient streaming session,
      wherein the first and second display profiles are each configured with a bandwidth allocation for the first and second client media receivers based on the first display profile and second display profile,
      wherein the bandwidth allocation is modifiable based on streaming requests from each client media receiver;
   receiving user data by the streaming media server and through the user interface, wherein the user data modifies at least one of the first display profile, the second display profile, or the bandwidth allocation;
   determining, by the streaming media server, a first allotted threshold of transmission capacity based on the user data and the first display profile for the first client media receiver in the multiclient streaming session;
   determining, by the streaming media server, a second allotted threshold of transmission capacity based on the user data and the second display profile for the second client media receiver in the multiclient streaming session; and
   displaying, in the user interface, combinations of allotted thresholds of transmission capacity of each client media receiver in the set of client media receivers,
      wherein a sum of the allotted thresholds makes up a total amount of transmission capacity that is currently available,
      wherein the total amount of transmission capacity is split between allotted thresholds of each client media receiver in the set of client media receivers that is in communication with the streaming media server.

2. The method of claim 1, further comprising:
   constructing, using data received from the user interface and by the streaming media server, a third display profile for a third display device of a third client media receiver participating in the multiclient streaming session.

3. The method of claim 2, further comprising:
   retraining, by the user interface, data contained in a two-dimensional table that stores client media receiver identifiers for each client media receiver to add a new device category for the third client media receiver, and to change the third display profile associated with the third client media receiver.

4. The method of claim 3, further comprising:
   changing, using data from the user interface during a setup phase, a device type corresponding to the first client media receiver to construct the first display profile for the first client media receiver.

5. The method of claim 4, further comprising:
   transmitting unique client media receiver identifiers stored in a two-dimensional table to the streaming media server when initiating the multiclient streaming session.

6. The method of claim 1, further comprising:
   encoding a plurality of segments of a first video stream and a plurality of segments of a second video stream for transmission to the respective first and second client media receivers at variable bitrates regulated in accordance with the first and second allotted thresholds of transmission capacity of each client media receiver.

7. The method of claim 6, further comprising:
   concurrently transmitting an encoded segment of the first video stream and an encoded segment of the second video stream over the network,
      wherein the encoded segment of the first video stream is transmitted to the first client media receiver for presentation on a first display device associated with the first client media receiver;
      wherein the encoded segment of the second video stream is transmitted to the second client media receiver for presentation on a second display device associated with the second client media receiver.

8. A method that is carried out by a streaming media server engaged in a multiclient streaming session over a network, comprising:
   establishing a first and a second bandwidth capacity between a set of client media receivers comprising at least a first and a second client media receiver:
   configuring a first display profile of the first client media receiver based on a first plurality of display parameters including a first display size and a first display resolution;

configuring a second display profile of the second client media receiver based on a second plurality of display parameters including a second display size and a second display resolution;

generating a user interface for displaying a set of display profiles identifying at least the first and second client media receivers, the set of display profiles comprising the first display profile for the first client media receiver and the second display profile for the second client media receiver, wherein the first and second client media receivers are displayed with display data based on the first and second display parameters for the multiclient streaming session;

receiving allotted threshold data through a selection of the user interface, the allotted threshold data including a display and device type, the allotted threshold data including a first allotted threshold of bandwidth capacity based on the first display profile for the first client media receiver, the allotted threshold data including a second allotted threshold of bandwidth capacity based on the second display profile for the second client media receiver; and transmitting a first stream to the first client media receiver at a first bitrate based on the first allotted threshold of bandwidth capacity, wherein the first allotted threshold of bandwidth capacity is based on the received allotted threshold data; and transmitting a second stream to the second client media receiver at a second bitrate based on the second allotted threshold of bandwidth capacity, wherein the second allotted threshold of bandwidth capacity is based on the received allotted threshold data.

9. The method of claim 8, further comprising:
changing, by using data received from the user interface, during a setup phase, a device category corresponding to at least one of the client media receivers of the set of client media receivers to construct a display profile for a respective display device associated with one of the client media receivers.

10. The method of claim 9, further comprising:
retraining, by the user interface, data of a two-dimensional table that stores identifier data corresponding to the device category of each client media receiver, to change the display profile for each client media receiver based on the user interface's data.

11. The method of claim 10, further comprising:
changing, by the user interface during the setup phase, the device type corresponding to one of the client media receivers of the set of client receivers, to construct the display profile for an associated display device of a respective client media receiver based on the user interface's data.

12. The method of claim 11, further comprising:
transmitting a unique client media receiver's identifier stored in the two-dimensional table that identifies the respective media client receiver to the streaming media server when initiating a multiclient streaming session.

13. The method of claim 8 further comprising:
encoding segments of the first stream at the first bitrate regulated in accordance with the first allotted threshold of transmission capacity the first media client receiver; and encoding segments of the second stream at the second bitrate regulated in accordance with the second allotted threshold of transmission capacity of the second media client receiver.

14. The method of claim 13, further comprising:
transmitting the encoded segments of the first and second streams over the network to the first and second client media receivers for presentation.

15. The method of claim 14, further comprising:
prior to engaging in the multiclient streaming session, during a setup phase, assigning bandwidth allotment thresholds to the client media receivers based on a total number of client media receivers engaged in the multiclient streaming session and profile data pertaining to the display devices; and modifying variable bitrates at which the segments of the first and second streams are encoded during the multiclient streaming session, while limiting the variable bitrates in accordance with the bandwidth allotment thresholds assigned to the client media receivers.

16. The method of claim 15 further comprising:
adjusting, by the user interface, the bandwidth allotment thresholds in response to a change in the total number of client media receivers engaged in the multiclient streaming session.

17. The method of claim 16 further comprising, at the streaming media server:
determining, by the user interface, whether the client media receivers are associated with display device types of a device type category from a plurality of device type categories; and when determining that client media receivers are associated with the display device types of the device type category, assigning equivalent bandwidth allotment thresholds to the client media receivers.

18. A streaming media server, comprising:
a processor; and
a computer-readable storage medium storing computer-readable code that, when executed by the processor, causes a streaming media receiver to perform operations, comprising:

configuring a first display profile of the first client media receiver based on a first plurality of display parameters including a first display size and a first display resolution;

configuring a second display profile of the second client media receiver based on a second plurality of display parameters including a second display size and a second display resolution;

generating a user interface for displaying a set of display profiles identifying at least a first and second media receivers, the set of display profiles comprising the first display profile for the first client media receiver and the second display profile for the second client media receiver, wherein the first and second client media receivers are displayed with display data based on the first and second display parameters for a multiclient streaming session;

receiving allotted threshold data through a selection of the user interface, the threshold data including a first allotted threshold of bandwidth capacity based on the first display profile for the first client media receiver, the threshold data including a second allotted threshold of bandwidth capacity based on the second display profile for the second client media receiver;

transmitting a first stream to the first media client display device at a first bitstream based on the first allotted threshold of bandwidth capacity, wherein the first allotted threshold of bandwidth capacity is based on the received allotted threshold data;

transmitting a second stream to the second media client display device at a second bitrate based on the second allotted threshold of bandwidth capacity, wherein the second allotted threshold of bandwidth capacity is based on the received allotted threshold data; and combining, by the user interface, first and second allotted thresholds of bandwidth capacity of each client media receiver in the set of client media receivers to present sum totals of bandwidth capacity that is available.

19. The streaming media server of claim 18 wherein, when the computer-readable code is executed by the processor, the streaming media receiver further performs the operation comprising:

receiving the display data transmitted over a network from the client media receivers; and defining display profiles based on the display data received from the client media receivers.

20. The streaming media server of claim 19, further comprising establishing, at the streaming media server, first and second allotment thresholds of bandwidth capacity based on whether a video stream contains three dimensional content.

* * * * *